United States Patent
Lutz

(10) Patent No.: US 12,259,716 B2
(45) Date of Patent: Mar. 25, 2025

(54) METHOD AND INDUSTRIAL AUTOMATION SYSTEM WITH A SYSTEM FOR EMBEDDING A WEB APPLICATION TO BE EMBEDDED IN A SURROUNDING WEB APPLICATION

(71) Applicant: Siemens Aktiengesellschaft, Munich (DE)

(72) Inventor: Benjamin Lutz, Pfinztal (DE)

(73) Assignee: Siemens Aktiengesellschaft, Munich (DE)

(*) Notice: Subject to any disclaimer, the term of this patent is extended or adjusted under 35 U.S.C. 154(b) by 427 days.

(21) Appl. No.: 17/598,945

(22) PCT Filed: Mar. 17, 2020

(86) PCT No.: PCT/EP2020/057201
§ 371 (c)(1),
(2) Date: Sep. 28, 2021

(87) PCT Pub. No.: WO2020/200751
PCT Pub. Date: Oct. 8, 2020

(65) Prior Publication Data
US 2022/0187801 A1    Jun. 16, 2022

(30) Foreign Application Priority Data
Mar. 29, 2019 (EP) .................................. 19000157

(51) Int. Cl.
*G05B 19/418* (2006.01)
(52) U.S. Cl.
CPC ... *G05B 19/4185* (2013.01); *G05B 19/41865* (2013.01); *G05B 19/4188* (2013.01)
(58) Field of Classification Search
CPC .... G06F 11/202; H04L 67/02; H04L 67/1001; H04L 67/101; H04L 67/1012
See application file for complete search history.

(56) References Cited

U.S. PATENT DOCUMENTS

| | | | |
|---|---|---|---|
| 7,925,655 B1* | 4/2011 | Power | G06F 16/334 707/741 |
| 2002/0013838 A1* | 1/2002 | Kushida | H04L 67/101 709/223 |

(Continued)

FOREIGN PATENT DOCUMENTS

| | | |
|---|---|---|
| CN | 1225186 | 8/1999 |
| CN | 1620811 | 5/2005 |

(Continued)

OTHER PUBLICATIONS

PCT International Search Report dated Jun. 26, 2020 based on PCT/EP2020/057201 filed Mar. 17, 2020.

(Continued)

*Primary Examiner* — Santosh R Poudel
(74) *Attorney, Agent, or Firm* — Cozen O'Connor

(57) ABSTRACT

Industrial automation system with a system for embedding a web application to be embedded in a surrounding web application and method for embedding a web application into a surrounding web application, wherein the web application to be embedded is provided to run in a separate execution and display region of the surrounding web application, the web application to be embedded is provided by at least two web servers so as to increase redundancy, monitoring capability and operability and therefore fault tolerance, to reduce complexity, to reduce communication traffic and to obtain improved options for access restriction for personnel, particularly in large industrial automation systems, such as process control systems.

9 Claims, 2 Drawing Sheets

(56) References Cited

U.S. PATENT DOCUMENTS

| | | |
|---|---|---|
| 2005/0108563 A1 | 5/2005 | Becker et al. |
| 2005/0262343 A1 | 11/2005 | Jorgensen et al. |
| 2007/0005689 A1 | 1/2007 | Leighton et al. |
| 2008/0040653 A1* | 2/2008 | Levine ................. G06Q 30/02 705/14.69 |
| 2009/0070765 A1 | 3/2009 | Alves et al. |
| 2010/0042724 A1 | 2/2010 | Jeon et al. |
| 2010/0095220 A1* | 4/2010 | Kassab ................ G06F 16/958 715/745 |
| 2010/0306052 A1* | 12/2010 | Britton .............. G06Q 30/0255 709/219 |
| 2012/0124123 A1* | 5/2012 | Pierce ................ H04N 21/4782 715/234 |
| 2013/0166999 A1 | 6/2013 | Camera |
| 2016/0006841 A1 | 1/2016 | Gurevich et al. |
| 2016/0085734 A1 | 3/2016 | Piccazzo |
| 2016/0195859 A1 | 7/2016 | Britt et al. |
| 2017/0093838 A1 | 3/2017 | Eckl et al. |
| 2018/0240322 A1 | 8/2018 | Potucek et al. |
| 2019/0044997 A1 | 2/2019 | Eckl et al. |

FOREIGN PATENT DOCUMENTS

| | | |
|---|---|---|
| CN | 1961525 | 5/2007 |
| CN | 103177065 | 6/2013 |
| CN | 103377210 | 10/2013 |
| CN | 103685375 | 3/2014 |
| CN | 105447615 | 3/2016 |
| CN | 109388110 | 2/2019 |
| EP | 2902857 | 8/2015 |
| EP | 3151503 | 4/2017 |
| RU | 2648564 C1 | 3/2018 |
| WO | 2007006045 A2 | 1/2007 |

OTHER PUBLICATIONS

EP Search Report dated Oct. 8, 2019 based on EP19000157 filed Mar. 29, 2019.
Wang et al. "Research on Security Model for Industrial Control Networks", vol. 34. No. 5, pp. 96-98, May 25, 2007.

* cited by examiner

METHOD AND INDUSTRIAL AUTOMATION SYSTEM WITH A SYSTEM FOR EMBEDDING A WEB APPLICATION TO BE EMBEDDED IN A SURROUNDING WEB APPLICATION

CROSS-REFERENCE TO RELATED APPLICATIONS

This is a U.S. national stage of application No. PCT/EP2020/057201 filed 17 Mar. 2020. Priority is claimed on European Application No. 19000157.8 filed 29 Mar. 2019, the content of which is incorporated herein by reference in its entirety.

BACKGROUND OF THE INVENTION

1. Field of the Invention

The invention relates to a method and to an industrial automation system with a system for embedding a web application to be embedded into a surrounding web application.

2. Detailed Description of the Related Art

Industrial automation systems are used to monitor, control and regulate technical processes, particularly in the field of manufacturing automation, process automation and building automation, and enable operation of control facilities, sensors, machines and industrial plants, which are to occur as autonomously and independently of human intervention as possible. Due to the steadily increasing importance of information technology for automation systems, which comprise numerous networked controller and computer units, methods for reliably providing functions distributed across an automation system for providing monitoring, control and regulation functions are gaining even more importance.

It is already known from EP 2 902 857 B1 to make functions of an industrial automation system available via web applications, which are consolidated on the client side during a control program sequence or at runtime to form interlinked web applications and are provided at a client-side user interface. The web applications each comprise at least one application component, for which at least one component instance is generated in each case. Preferably, the client-side user interface comprises a web browser.

A web application involves an application program in accordance with the client-server model (see e.g. WIKIPEDIA).

EP 3 151 503 A1 discloses a method and system for embedding a web application to be embedded into a surrounding web application, where the surrounding first web application is run in a browser and the second web application to be embedded is provided to run in a separate execution and display region of the surrounding first web application, where the surrounding first web application is provided by a first web server, and the second web application to be embedded is provided by a second web server.

US 2007/0005689 discloses a content distribution system, in which a base html document of a website is provided by a server of a content provider, while data objects (image files, audio files, video files) to be embedded into this website are provided by other servers, which are preferably located in the vicinity of the client. Content is therefore distributed over a collection of servers, where the use of memories is optimized and overloading of servers is avoided.

US 2010/0042724 A1 likewise discloses a content distribution system, in which data objects (image files, audio files, video files) are embedded into a website of a content provider. In this context, the data objects to be embedded, depending upon the location of a client, are either provided by the web server that provides the website or by another server.

In the case of US 2007/0005689 A1 and US 2010/0042724 A1, only data objects, but not application programs, are therefore embedded into a website.

In the case of distributed services, the service components of which are provided by a plurality of different controller and computer units for implementing functions of an automation system, there are high requirements on a communication infrastructure of the automation system. On the one hand, requirements for real-time communication usually must be met, while it should be possible to use different communication protocols for distributed services in as transparent a manner as possible, on the other hand. A low-performance communication infrastructure may put a fault-free provision of a service at risk and have disadvantageous effects on system stability and availability.

When accessing data and measurement values that are assigned to services within an industrial automation system, there are moreover often high requirements with regard to availability and quality of service.

Additionally, for reasons relating to operational safety, reducing complexity and know-how protection, there are often also restrictions to the rights of internal personnel or external persons to services, data or measurement values of the automation system or of a plant or facility automated thereby.

These requirements are generally all the more important, the larger the automation system or a plant or facility automated thereby may be. They therefore apply in particular to large and complex process control systems, as are used for monitoring, controlling and regulating process industry plants (e.g., chemical sciences, pharmaceuticals, metals, oil and gas, and/or paper).

SUMMARY OF THE INVENTION

It is therefore the object of the present invention to provide a method and an industrial automation system, with which the foregoing requirements can be met in an even more improved manner than previously possible particularly in large industrial process control systems.

This and other objects and advantages are achieved in accordance with the invention by an industrial automation system, in particular a process control system, and a method for embedding a web application to be embedded into a surrounding web application, where the web application to be embedded is provided to run in a separate execution and display region of the surrounding web application, and the web application to be embedded is provided by at least two web servers. Preferably, the surrounding web application is run in a browser in this context.

By providing the same web application to be embedded via at least two web servers, it is possible for the web application and the function provided thereby to continue to be made available in the event of a failure of one of the two web servers. Particularly in the case of large complex systems with a large number of services or functions, data sources and a large number of persons that have monitoring or controlling access to the services or functions, however, this also offers additional flexibility when dividing the services or functions, data sources, data acquisitions and data storages across different subsystems and servers assigned thereto in each case. This can be used to increase redundancy, monitoring capability and operability and therefore fault tolerance, to reduce complexity, to reduce communication traffic and to obtain improved options for access restriction for personnel.

In this context, in accordance with the invention at least one criterion is defined, which is used to determine, preferably in an automated manner, the web server of the at least two web servers of which the provided web application to be embedded is embedded into the surrounding web application. The criterion may in this context also be saved, for example, implicitly based on assignments of web applications to web servers, where the assignments are backed up in the web server (e.g., as part of project planning of the server system).

In accordance with the invention, the web application that is to be embedded or is embedded and the at least two web servers are communicatively interconnected via a communication facility and the criterion relates to the communication in the communication facility. Here, the criterion is a reduction of data traffic in the communication facility between the at least two web servers.

In accordance with a further advantageous embodiment, a web server that provides the surrounding web application ascertains, based on the criterion, the web server of the at least two web servers of which the provided web application to be embedded is embedded into the surrounding web application.

The web server that provides the surrounding web application can then communicate the ascertained web server to the surrounding web application upon the running thereof, so that this then embeds the web application of the ascertained web server into the surrounding web application.

The web server that provides the surrounding web application can additionally also communicate to the surrounding web application, upon the running thereof, the other web server(s) that provide(s) the web application to be embedded. In the event of a failure of the embedded web application, it is then possible to switch to another web server without a major delay and the web application of the web server can then be integrated.

Alternatively, it is also possible for the at least one criterion for the determination of the web server for the application to be embedded to only be provided by a web server that provides the surrounding web application, and to then be used at a different point for the determination of the web server of the web application to be embedded. For example, the surrounding application or another service can then itself determine the web server based on the at least one criterion.

Advantageously, there is a data interface between the web applications. This makes it possible for the web applications to interact with one another. Services or functions coupled to one another can therefore be integrated into an automation system in a flexible manner.

In accordance with the invention, the method is used in an industrial automation system, in particular a process control system, i.e., functions in an industrial automation system are provided by the web applications.

It is also an object of the invention to provide an industrial automation system, in particular a process control system, with a system for embedding a web application to be embedded into a surrounding web application, where the web application to be embedded is provided to run in a separate execution and display region of the surrounding web application, comprises at least two web servers, which provide the web application to be embedded (i.e., provide the same web application). Preferably, the system comprises a browser that is embodied to run the surrounding web application.

In accordance with the invention, the system is configured to determine, based on at least one criterion, the web server of the at least two web servers of which the provided web application to be embedded is to be embedded into the surrounding web application.

The web application and the at least two web servers are, in this case, communicatively interconnected via a communication facility and the criterion relates to the communication in the communication facility.

The criterion is, in this case, a reduction of data traffic in the communication facility between the at least two web servers.

A web server that provides the surrounding web application is preferably configured to ascertain, based on the criterion, the web server of the two web servers of which the provided web application to be embedded is to be embedded into the surrounding web application.

The web server that provides the surrounding web application is then advantageously also embodied to communicate the ascertained web server to the surrounding web application, upon the running thereof.

The web server that provides the surrounding web application can also be configured to additionally also communicate to the surrounding web application, upon the running thereof, the other web servers that provide the web application to be embedded.

Alternatively, it is also possible for the criterion to only be provided by a web server that provides the surrounding web application, and to be used at a different point for the determination of the web server of the web application to be embedded.

Advantageously, there is a data interface between the web applications.

The advantages mentioned for the method in accordance with the invention and its advantageous embodiments are also accordingly applicable to the industrial automation system in accordance with the invention and its advantageous embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention as well as further advantageous embodiments of the invention in accordance with features of the dependent claims are described in greater detail below with reference to exemplary embodiments in the figures, in which:

DETAILED DESCRIPTION OF THE EXEMPLARY EMBODIMENTS

Figure 1:
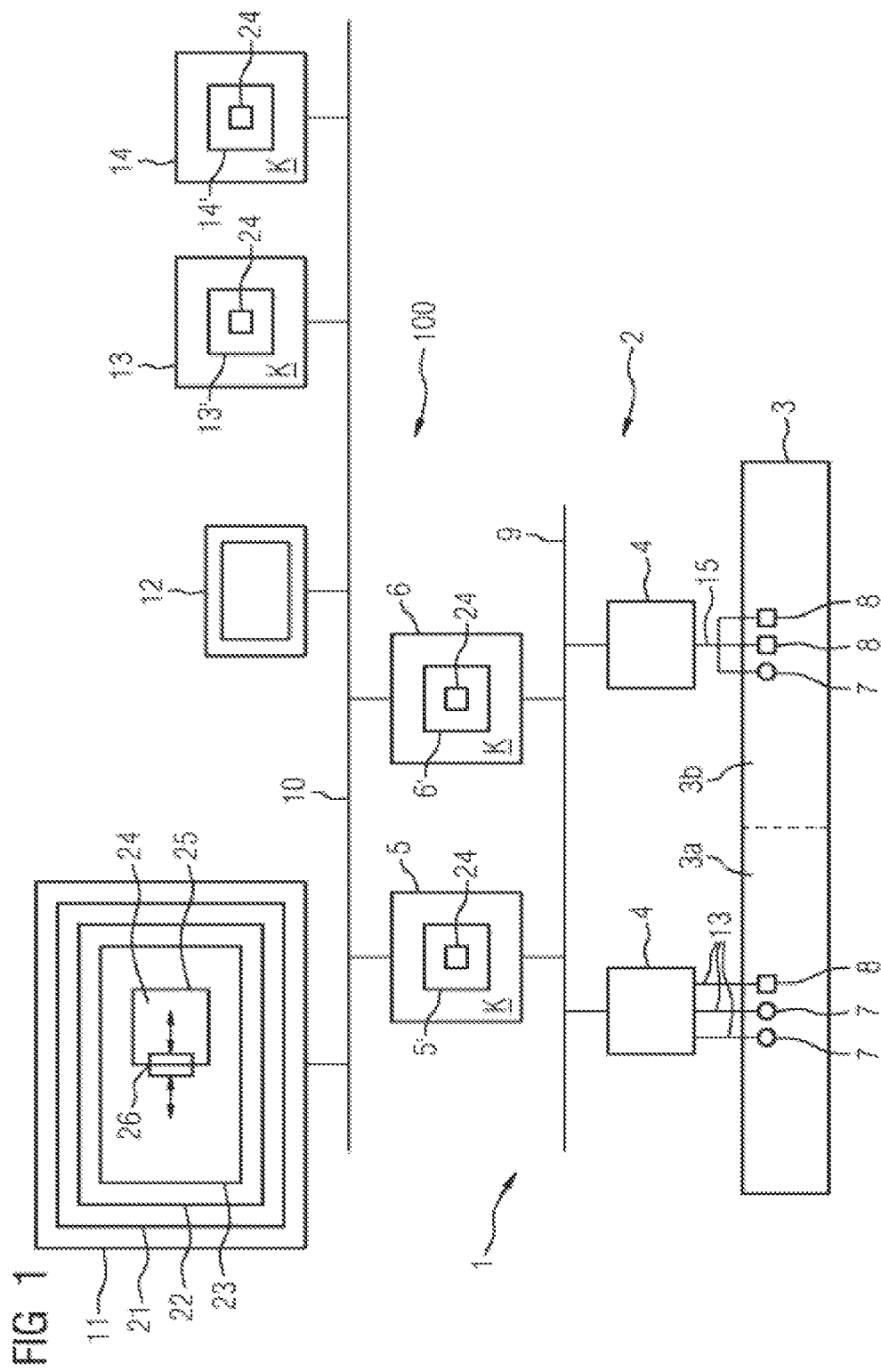
FIG. 1 shows a simplified representation of a basic structure of a system in accordance with the invention.

FIG. 1 shows a simplified representation of an industrial plant 1 with an industrial automation system 2. Plants 1 of this kind are used in a wide variety of industrial sectors, for example in the process industry (e.g., chemical sciences, pharmaceuticals, metals, oil and gas, and/or paper), the discrete manufacturing industry and in energy generation. The actual industry-specific process 3, e.g., a production process or energy generation process, is controlled and/or regulated and monitored by the automation system 2. To this end, the automation system 2 comprises one or more industrial controllers (here the controllers 4) and two or more automation servers 5, 6, which are frequently also referred to as "application servers" or "operator system servers".

Each of the controllers 4 then controls the operation of a subprocess 3a or 3b of the process 3 in each case, as a function of the operating states thereof. To this end, the process 3 comprises actuators 7 that can be actuated by the controllers 4. This may involve individual actuators (e.g., a motor, a pump, a valve, or a switch) or a group of actuators of this kind or entire sections of a plant. The process furthermore comprises sensors 8, which make actual values of process variables (e.g., temperatures, pressures, or speeds) available to the controllers 4. In this context, the automation server 5 is assigned to the subprocess 3a and the automation server 6 is assigned to the subprocess 3b. The automation system 2 without the field devices (i.e., without actuators 5 and sensors 6) is frequently also referred to as a "process control system".

A communication network of the plant 1 comprises, at a higher level, a plant network 10, preferably established in the form of a bus, via which the automation servers 5, 6 are in communication with two operator control and process monitoring stations 11, 12, frequently also referred to as "operator stations", and a control network 9, preferably configured as a bus, via which the controllers 4 are communicatively connected to one another and to the automation servers 5, 6. The connection of the controllers 4 to the actuators 7 and sensors 8 may occur via discrete signal lines 13 or via a field bus 15. In process control systems, the plant network 11 is also referred to as "terminal network" or "terminal bus" and the controller network is also referred to as "plant network" or "plant bus".

Stored in the automation servers 5, 6 are one or more plant-specific application programs, which are made to run during operation of the plant 1. These are used, for example, in the plant 1 to configure the controllers 4, to record and perform operator activities at the operator control and process monitoring stations 11, 12 (e.g., to set or change setpoint values of process variables) or to generate reports for plant personnel and cause the reports to be displayed on the operator control and process monitoring stations 11, 12. In the process control system, the operator control and process monitoring stations 11, 12 are usually arranged in a control room of the plant 1.

The automation system 2 comprises yet further servers, such as a maintenance server 13 and an engineering server 14, for example, which are likewise connected to the plant network 10.

The servers 5, 6, 13, 14 each comprise a web server 5', 6', 13' and 14', which provides a web application 24.

A display 21 of the operator control and process monitoring station 11 shows a web browser (browser for short) running thereon, which can be or is communicatively connected to the web servers 5', 6', 13' and 14' via the network 10.

Running in the browser 22 is a first web application 23, which in the following is also to be called "surrounding web application" and which is at least partially supported ("hosted") by the web server 5'; in a similar manner, a second web application 24, which in the following is also to be called "web application to be embedded", is at least partially supported ("hosted") by one of the web servers 5', 6', 13' and 14'. The web application 24 to be embedded is provided to run in a separate execution and display region 25, which is formed as an "inline frame" or "iframe", in the surrounding web application 23. Arranged between the separate execution and display region 25 and the surrounding web application 23 is an integration interface 26 for exchanging messages or reports. Furthermore, communication channels are each established between the web applications 23, 24 and their assigned web servers.

In accordance with the invention, the web application 24 to be embedded is provided by at least two web servers, here even by the entirety of the web servers 5', 6', 13', 14'. In other words, the entirety of the web servers 5', 6', 13', 14' provide the same web application 24. By providing the web application 24 to be embedded via the plurality of web servers 5', 6', 13', 14', it is possible for the web application 24 and the function provided thereby to continue to be made available in the event of a failure of one of the web servers 5', 6', 13', 14'. Particularly in the case of large complex systems with a large number of services or functions, data sources and a large number of persons that have monitoring or controlling access to the services or functions, this offers additional flexibility when dividing the services or functions, data sources, data acquisitions and data storages across different subsystems, here for example across the two subprocesses 3a, 3b of the process 3, and servers assigned thereto in each case, here for example the server 5 assigned to the subprocess 3a and the server 6 assigned to the subprocess 3b.

This can be used to increase redundancy, monitoring capability and operability and therefore fault tolerance, to reduce complexity, to reduce communication traffic and to obtain improved options for access restrictions for personnel.

The system comprising the web servers 5', 6', 13', 14', the web applications 23, 24 and the separate execution and display region 25 is in this context designated 100.

Advantageously, in this context, at least one criterion K is defined, on the basis of which the web server 5', 6', 13', 14', of which the provided web application 24 is embedded into the surrounding web application 23, is automatically determined by the web server 5' that provides the surrounding web application 23. Here, the criterion may also be saved implicitly, for example, on the basis of fixed assignments of web applications 24 to the web servers 5', 6', 13', 14', which assignments are backed up in the web server 5'.

Preferably, the criterion relates to the communication in the plant network 10, in particular to a reduction of data traffic in the plant network 10, and here in particular between the web servers 5', 6', 13', 14'. This is primarily important if data or visualizations of the process 3 or of the automation system 2 are only originally available in one of the servers 5, 6, 13, 14. For example, data regarding process values from the subprocess 3b is originally only available to the server 6. If, however, the web application 24 of the web server 5' is now embedded into the surrounding web application 23, this data has to be transferred from the server 6, via the plant network 10, to the server 5. There is therefore slave-to-slave data communication between the servers 5, 6, which leads to undesirable strain on the plant network 10.

The criterion K is (or the criteria are, if applicable) backed up in the servers 5, 6, 13, 14 or web servers 5', 6', 13', 14'.

Figure 2:
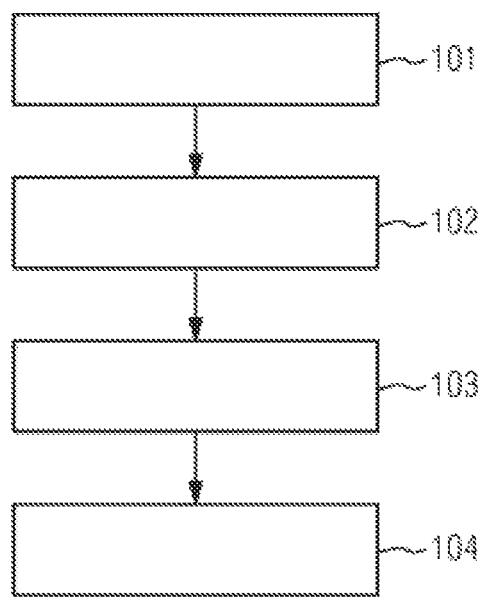
FIG. 2 shows a method sequence according to the invention.

FIG. 2 is an illustration of an advantageous method sequence in accordance with the invention.

In this context, it is assumed by way of example that the criterion K is the reduction of data traffic in the plant network 10 and that the web application 24 requires data from the subprocess 3b.

With reference to FIG. 2, the web server 5' that provides the surrounding web application 23, in a first step 101, ascertains which web servers in the automation system 2 provide the web application 24. Here, the web server 5' would ascertain the web servers 5', 6', 13', 14' by querying all servers, for example. Alternatively, this information may also already be stored in the web server 5', e.g. as part of the project planning of the automation system 2.

In a second step 102, the web server 5' ascertains, on the basis of the saved criterion K (here reduction of data traffic), the web server of the web servers 5', 6', 13', 14' of which the provided web application 24 to be embedded is embedded into the surrounding web application 23. In the cited example, this is the web server 6'. As already mentioned, the criterion may in this context also be saved, for example, implicitly based on assignments of web applications 24 to the web servers 5', 6', 13', 14', where the assignments are backed up in the web server 5' (e.g., as part of the project planning of the automation system 2).

In a further step 103, the web server 5' then communicates this ascertained web server 6' to the surrounding web application 23 upon the running thereof, so that this then embeds the web application 24 of said ascertained web server 6' into the surrounding web application 23.

In a step 104, the web server 5' that provides the surrounding web application 23 additionally also communicates to the surrounding web application 23, upon the running thereof, the other web servers 5', 13', 14' that provide the web application 24 to be embedded. In the event of a failure of the web application 24 of the web server 6', it is then possible to switch the surrounding web application 23 to another of the web servers 5', 13', 14' without a major delay, i.e., establish a communication channel with said web server, and embed the web application 24 of said web server.

Alternatively, the web server 5' that provides the surrounding web application 23 may also only provide the criterion K "reduction of the data traffic". This can then be used at another point for the determination of the web server of the web application 24 to be embedded. For example, the surrounding web application 23 or another service can itself then determine the web server for the web application 24 to be embedded on the basis of the criterion.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for embedding a web application to be embedded into a surrounding web application, the web application to be embedded being provided to run in a separate execution and display region of the surrounding web application, the method comprising:
   providing the web application to be embedded by at least two web servers;
   defining at least one criterion which is used to determine the web server of the at least two web servers of which the provided web application to be embedded is embedded into the surrounding web application;
   interconnecting the web application to be embedded and the at least two web servers communicatively via a communication facility, the criterion relating to the communication in the communication facility, and the criterion being a reduction of data traffic in the communication facility between the at least two web servers;
   wherein functions in an industrial automation system are provided by the web application;
   wherein the automation system at least one of (i) controls and/or regulates and (ii) monitors a process; and
   wherein the criterion is a reduction of the data traffic which occurs due to transferring process values of the process between the at least two web servers.

2. The method as claimed in claim 1, wherein a web server of the at least two web servers which provides the surrounding web application ascertains, based on the criterion, the web server of the at least two web servers of which the provided web application to be embedded is embedded into the surrounding web application.

3. The method as claimed in claim 2, wherein the web server, which provides the surrounding web application, communicates the ascertained web server to the surrounding web application upon the running thereof.

4. The method as claimed in claim 3, wherein the web server which provides the surrounding web application additionally also communicates to the surrounding web application, upon the running thereof, an identity of other web servers which provide the web application to be embedded.

5. An industrial automation system, comprising:
   a system for embedding a web application to be embedded into a surrounding web application, the web application to be embedded being provided to run in a separate execution and display region of the surrounding web application; and
   at least two web servers each comprising a hardware processor, said at least two web servers providing the web application to be embedded;
   wherein the system for embedding the web application is configured to determine, on the basis of at least one criterion, the web server of the at least two web servers of which the provided web application to be embedded is to be embedded into the surrounding web application;
   wherein the web application to be embedded and the at least two web servers are communicatively interconnected via a communication facility and in which the criterion is a reduction of data traffic in the communication facility between the at least two web servers;

wherein the web application provides functions of the automation system;

wherein the automation system at least one of (i) controls and/or regulates and (ii) monitors a process; and wherein the criterion is a reduction of the data traffic which occurs due to transferring process values of the process between the web servers.

6. The industrial automation system as claimed in claim 5, wherein a web server which provides the surrounding web application is configured to ascertain, based on the criterion, the web server of the at least two web servers of which the provided web application to be embedded is to be embedded into the surrounding web application.

7. The industrial automation system as claimed in claim 6, wherein the web server which provides the surrounding web application is configured to communicate the ascertained web server to the surrounding web application upon the running thereof.

8. The industrial automation system as claimed in claim 7, wherein the web server which provides the surrounding web application is additionally configured to also communicate to the surrounding web application, upon the running thereof, an identity of other web servers that provide the web application to be embedded.

9. The industrial automation system as claimed in claim 5, wherein the automation system is a process control system.

* * * * *